(12) United States Patent
Baxter (10) Patent No.: US 7,861,684 B2
(45) Date of Patent: Jan. 4, 2011

(54) COMPRESSION IGNITION ENGINE AND METHOD FOR CONTROLLING SAME

(75) Inventor: John M Baxter, Newtown Square, PA (US)

(73) Assignee: Advanced Diesel Concepts LLC, Blue Bell, PA (US)

( * ) Notice: Subject to any disclaimer, the term of this patent is extended or adjusted under 35 U.S.C. 154(b) by 51 days.

(21) Appl. No.: 12/465,994

(22) Filed: May 14, 2009

(65) Prior Publication Data

US 2010/0288227 A1 Nov. 18, 2010

(51) Int. Cl.
*F02M 69/54* (2006.01)
(52) U.S. Cl. .................. 123/294; 123/304; 123/681; 123/457; 123/511
(58) Field of Classification Search .............. 123/294, 123/304, 681, 457, 511
See application file for complete search history.

(56) References Cited

U.S. PATENT DOCUMENTS

| | | | |
|---|---|---|---|
| 2,244,874 A | 6/1941 | Fiedler | |
| 2,250,364 A | 7/1941 | Fiedler | |
| 2,948,273 A | 8/1960 | Suttle | |
| 3,575,145 A | 4/1971 | Steiger | |
| 3,587,547 A | 6/1971 | Hussey | |
| 3,827,409 A | 8/1974 | O'Neill | |
| 3,907,209 A | 9/1975 | Fiedler | |
| 4,275,693 A | 6/1981 | Leckie | |
| 5,201,300 A | 4/1993 | Iiyama | |
| 5,456,233 A | 10/1995 | Felhofer | |
| 5,839,412 A | 11/1998 | Stockner et al. | |
| 5,967,119 A | 10/1999 | Burkhard et al. | |
| 6,230,683 B1 | 5/2001 | Zur Loye et al. | |
| 6,253,735 B1 * | 7/2001 | Miyajima | 123/456 |
| 6,712,044 B1 * | 3/2004 | Rembold et al. | 123/456 |
| 6,718,948 B2 * | 4/2004 | Vahle et al. | 123/458 |
| 6,748,924 B2 | 6/2004 | Yu | |
| 7,124,746 B2 | 10/2006 | Brocco et al. | |
| 7,150,262 B2 | 12/2006 | Demura et al. | |
| 7,165,527 B2 | 1/2007 | Okude et al. | |
| 7,178,507 B1 | 2/2007 | Gangopadhyay | |
| 7,182,066 B2 | 2/2007 | Goya et al. | |

(Continued)

OTHER PUBLICATIONS

John M. Baxter, Working Toward Homogeneous Diesel Combustion: A Fresh Look at the Work of Max Fiedler, Commercial Carrier Journal, 2001, vol. 32-2, Paper No. 2001-ICE-418, pp. 107-117.

(Continued)

*Primary Examiner*—Erick Solis
(74) *Attorney, Agent, or Firm*—Stephen H. Eland; Dann, Dorfman, Herrell & Skillman (57) ABSTRACT

An engine having improved combustion characteristics is provided. The engine includes a fuel injection system that is variable between two operational states. In the first operating state, the fuel injectors provide a fuel spray having first spray pattern characteristics. When the system detects that an operation characteristic exceeds a threshold, the fuel injectors are displaced into a second operating state. In the second operating state, the fuel injectors provide a spray pattern having first spray pattern characteristics. The combustion cycle may be characterized by timing the fuel injection so that the fuel is sprayed into the cylinder early in the compression stroke. Further still, the combustion cycle may be characterized by controlling the fuel pressure so that the fuel pressure is inversely related to the load on the engine.

23 Claims, 5 Drawing Sheets

U.S. PATENT DOCUMENTS

| | | |
|---|---|---|
| 2001/0008134 A1 | 7/2001 | Hasegawa et al. |
| 2001/0017127 A1 | 8/2001 | Flynn et al. |
| 2002/0026826 A1 | 3/2002 | Loye et al. |
| 2002/0088428 A1 | 7/2002 | Abo et al. |
| 2002/0185109 A1 | 12/2002 | Flynn et al. |
| 2003/0200955 A1 | 10/2003 | Zur Loye et al. |
| 2005/0022789 A1 | 2/2005 | Palma et al. |
| 2005/0092297 A1 | 5/2005 | Takemoto et al. |
| 2005/0092298 A1 | 5/2005 | Asano et al. |
| 2005/0121000 A1 | 6/2005 | Vermonet et al. |
| 2005/0145220 A1 | 7/2005 | Damitz et al. |
| 2005/0187700 A1 | 8/2005 | Jacobson |
| 2005/0205062 A1 | 9/2005 | Fuwa et al. |
| 2005/0224601 A1* | 10/2005 | Baker et al. ............... 239/132.5 |
| 2005/0229903 A1 | 10/2005 | Kobayashi et al. |
| 2006/0137648 A1 | 6/2006 | Nakashima et al. |
| 2006/0224296 A1 | 10/2006 | Goya et al. |
| 2006/0231066 A1 | 10/2006 | Demura et al. |
| 2008/0173280 A1* | 7/2008 | Hou ............................ 123/457 |
| 2009/0114193 A1* | 5/2009 | Cooke ........................ 123/457 |

OTHER PUBLICATIONS

Vaporization Control of HCCI Combustion of Diesel Fuel- A Promising New Direction in HCCI Research, presented on Sep. 24, 2001 at a meeting of the American Society of Mechanical Engineers.

* cited by examiner

COMPRESSION IGNITION ENGINE AND METHOD FOR CONTROLLING SAME

FIELD OF THE INVENTION

The present invention relates to the field of internal combustion engines. Aspects of the present invention relate more specifically to the field of compression ignition internal combustion engines and the method for controlling such engines to optimize combustion.

BACKGROUND

In a compression ignition engine, combustion is ignited without the use of a separate spark, such as a spark plug. Instead, the combustion charge is ignited by compressing air alone, or a fuel and air mixture, in a cylinder. Air alone may be compressed until its temperature exceeds a critical level, after which fuel is injected and it ignites; or a fuel and air mixture may be compressed until the temperature reaches a critical point, at which point the fuel and air mixture ignites.

A well-known example of a compression ignition system is the diesel engine. Although diesel engines have been known and used for generations, there continues to be a need to improve the efficiency of the combustion and to reduce undesirable combustion by-products.

One problem associated with the known compression ignition engines is that there is a desire to use a high enough compression ratio to optimize efficiency; however, as the compression ratio increases there is a tendency for the fuel-air mixture to ignite prematurely. For instance, the combustion may commence on the upstroke, known as the compression stroke, rather than on the down stroke of the piston, which is known as the power stroke. Diesel systems have overcome this problem by introducing the fuel into the combustion chamber later in the compression stroke. Although this change may limit premature combustion, delaying the fuel injection leads to other difficulties in the combustion. For instance, when the fuel injection is delayed, the fuel may not properly mix with the air, which can result in poor combustion of the fuel and air mixture. Accordingly, there exists a need for a combustion system that can improve the efficiency of the combustion process.

SUMMARY OF THE INVENTION

In light of the foregoing, the present invention provides various features that improve the combustion in an internal combustion engine. According to one aspect of the present invention, a compression ignition engine is provided in which the fuel is injected into the compression chamber at a varying pressure depending upon an operation characteristic of the engine. For instance, when the engine is operating under a first load, the fuel may be injected into the combustion chamber at a first pressure. When the load on the engine is increased beyond a threshold level, the fuel is injected into the combustion chamber at a second pressure that is less than the first pressure.

According to another aspect of the present invention, the characteristics of the fuel spray may be modified in response to an operational characteristic of the engine. For instance, when the engine is operating under a first load, the fuel may be sprayed into the combustion chamber such that the fuel is a spray of droplets generally having a first droplet size. When the load on the engine is increased, the fuel is sprayed into the combustion chamber so that the fuel is a spray of droplets generally having a second droplet size, which is larger than the first droplet size.

According to yet another aspect of the present invention, a compression ignition system is provided in which the injection of fuel commences and ends well before the end of the compression stroke.

According to another aspect of the present invention, a fuel injector is provided for spraying fuel into a combustion chamber of an internal combustion engine, in which the fuel injector includes a first set of discharge orifices having a first diameter and a second set of discharge orifices having a second diameter that is larger than the first diameter. The fuel injector further includes a control element for controlling when the fuel is injected into the combustion chamber through the first set of discharge orifices or the second set of orifices.

According to a further aspect, the present invention further provides a modified combustion chamber having a deflection element configured to direct the spray of fuel back toward a central axis as the fuel proceeds toward the walls of a recess in the piston.

These and other aspects of the present invention are described in greater detail in the accompanying detailed description.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Referring now to the figures in general, a compression ignition engine is designated generally 10. The engine 10 includes an engine block 15 having a plurality of cylinders 20. A cylinder head 25 is mounted to the top of the block 15 and forms a portion of the combustion chamber, or, possibly, the flat roof of the combustion chamber. The block comprises a plurality of cylinders, and each houses a piston 50. Each piston 50 is reciprocally displaceable within its corresponding cylinder 20. Each piston 50 is connected to a connecting rod 58, which in turn is connected to a crankshaft 59.

Features of the present engine are applicable to a variety of engines systems, including spark ignition and compression ignition. In the following discussion, the engine is described as being a compression ignition system. However, some aspects of the system may be operable in a spark ignition system. Additionally, the system is described as a four-stroke engine. However, aspects of the system may be adaptable in an engine using a different combustion cycle, such as a two-stroke engine. Accordingly, the following description of the engine as being a four-stroke compression ignition engine is an exemplary embodiment rather than an exclusive embodiment.

The engine 10 includes an intake port 30 and an exhaust port 32. The intake port 30 provides a fluid pathway for introducing a combustible gas, such as air, into the combustion chamber. The exhaust port 32 provides a fluid pathway for discharging the gases resulting from the combustion in the combustion chamber. In the exemplary embodiment illustrated in FIG. 1, the engine is a four-stroke engine 10. To facilitate the four-stroke operation, the engine includes an intake valve 35 controlling the flow of air through the air intake port 30 and an exhaust valve controlling the flow of exhaust gases through the exhaust port 32. Additionally, it may be desirable to utilize a multi-valve configuration using multiple intake and/or exhaust valves for each cylinder. For instance, in the present embodiment, the engine includes two intake valves 35 and two exhaust valves 37 for each cylinder.

Figure 1:
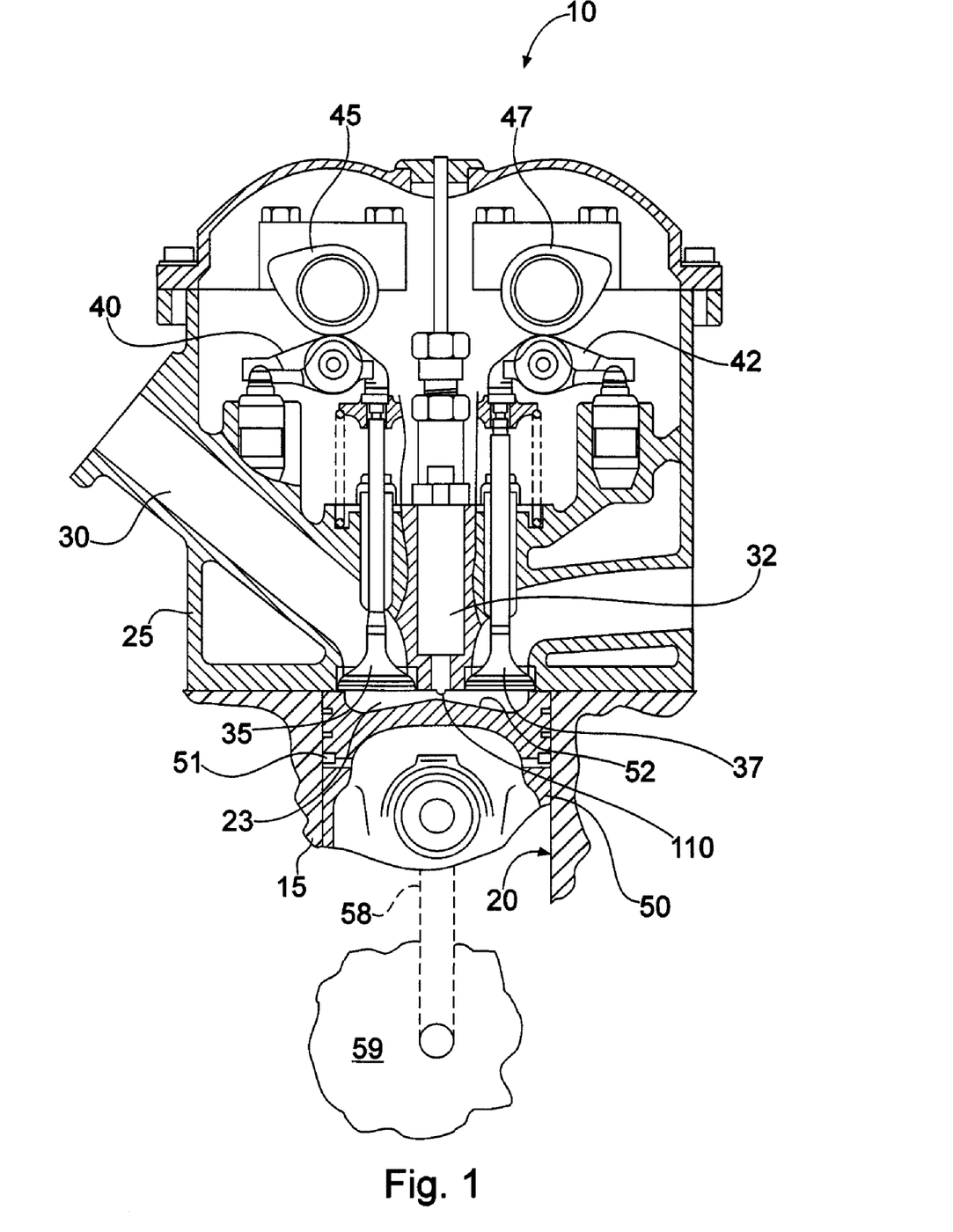
FIG. 1 is a cross sectional view of an internal combustion engine embodying aspects of the present invention.

The engine further includes elements for controlling the operation of the intake and exhaust valves 35, 37. For instance, as shown in FIG. 1, the engine 10 may include a pair of overhead cams 45, 47 for controlling the intake and exhaust valves. In FIG. 1, the overhead cams engage rocker arms that are biased upwardly. As the camshaft rotates, a lobe of the camshaft engages the rocker arm pivoting the rocker arm downwardly to open the attached valve. Although the valve control may incorporate a rocker arm, it may be desirable to position the camshaft directly over the valve so that the camshaft engages a tappet on the valve.

The piston 50 reciprocates within the cylinder 20 during operation. The piston includes ring seals 51 that form a seal between the piston and the cylinder wall. The piston 50 is connected with a connecting rod 58, which in turn is connected with a crankshaft 59. In the present instance, the crankshaft 59 is connected with the camshafts 45, 47 so that the camshafts rotate at half the speed of the crankshaft.

Figure 3:
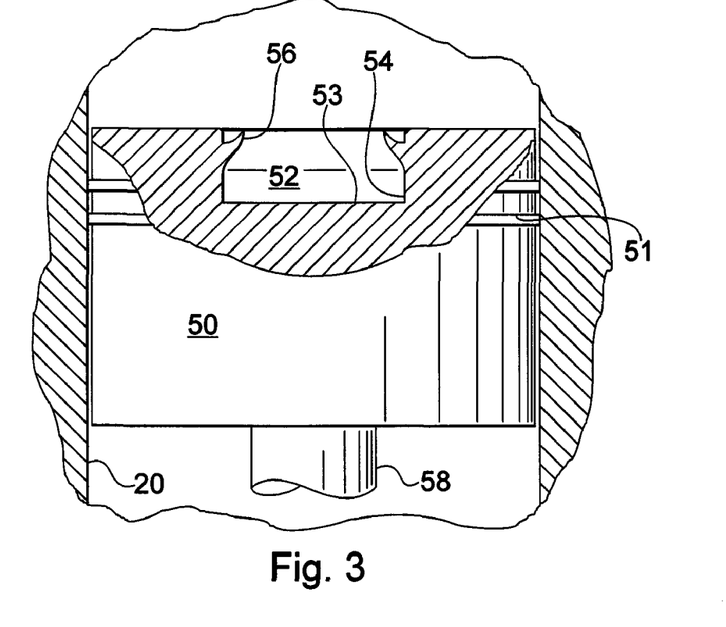
FIG. 3 is an enlarged fragmentary view of an alternate piston configuration operable in the engine of FIG. 1.

The crown or upper end of the piston 50 is recessed forming a hollowed bowl 52 that is part of the combustion chamber 23. In FIG. 1 the bowl 52 is illustrated as having a central portion that tapers upwardly. However, FIG. 3 illustrates a bowl configuration that is preferred, but not necessary. In FIG. 3, the bowl 52 has a generally flat bottom or floor 53. The side-walls 54 of the bowl angle upwardly, generally normal to the floor.

The bowl in the piston illustrated in FIG. 3 is deeper and has a smaller diameter than the known cylinders. Reducing the bowl diameter increases the annular ring at the top of the cylinder. The annular ring, which is referred to as the squish area, is the area on the top surface of the piston extending between the bowl and the outer edge of the piston. The squish area generates linear air motion when the piston drives toward top dead center. Increasing the squish area thereby increases the air motion for a given size of piston.

The piston illustrated in FIG. 3 also includes a deflection flange 56 that projects radially inwardly into the bowl. The flange 56 circumscribes the wall of the bowl, and is angled upwardly. It may also be desirable to incorporate an undercut in the top side of the flange, so that a groove is formed between the wall of the bowl and the tip of the flange, as shown in FIG. 3.

A fuel injector 70 is positioned over each cylinder 20 to spray fuel into the combustion chamber 23. The injector 70 is oriented so that the injector sprays fuel outward toward the cylinder walls but at a slight downward angle, toward the bowl 52 in the piston. Specifically, the injector 70 is axially elongated having a central axis. The central axis is directed toward the center of the bowl in the piston. As the fuel moves outward from the injector and slightly downward toward the floor 53 of the bowl 52, the air moves upwardly toward the nozzle. The circumferential deflection flange 56 directs the air toward the central axis of the spray of fluid discharging from the injector. In this way, the configuration of the bowl creates an airflow that opposes the fuel flow, slowing the droplets and also helping them to evaporate prior to touching any metal surfaces. It thus also aids in the mixing of the spray of fuel and the air in the combustion chamber.

Figure 4:
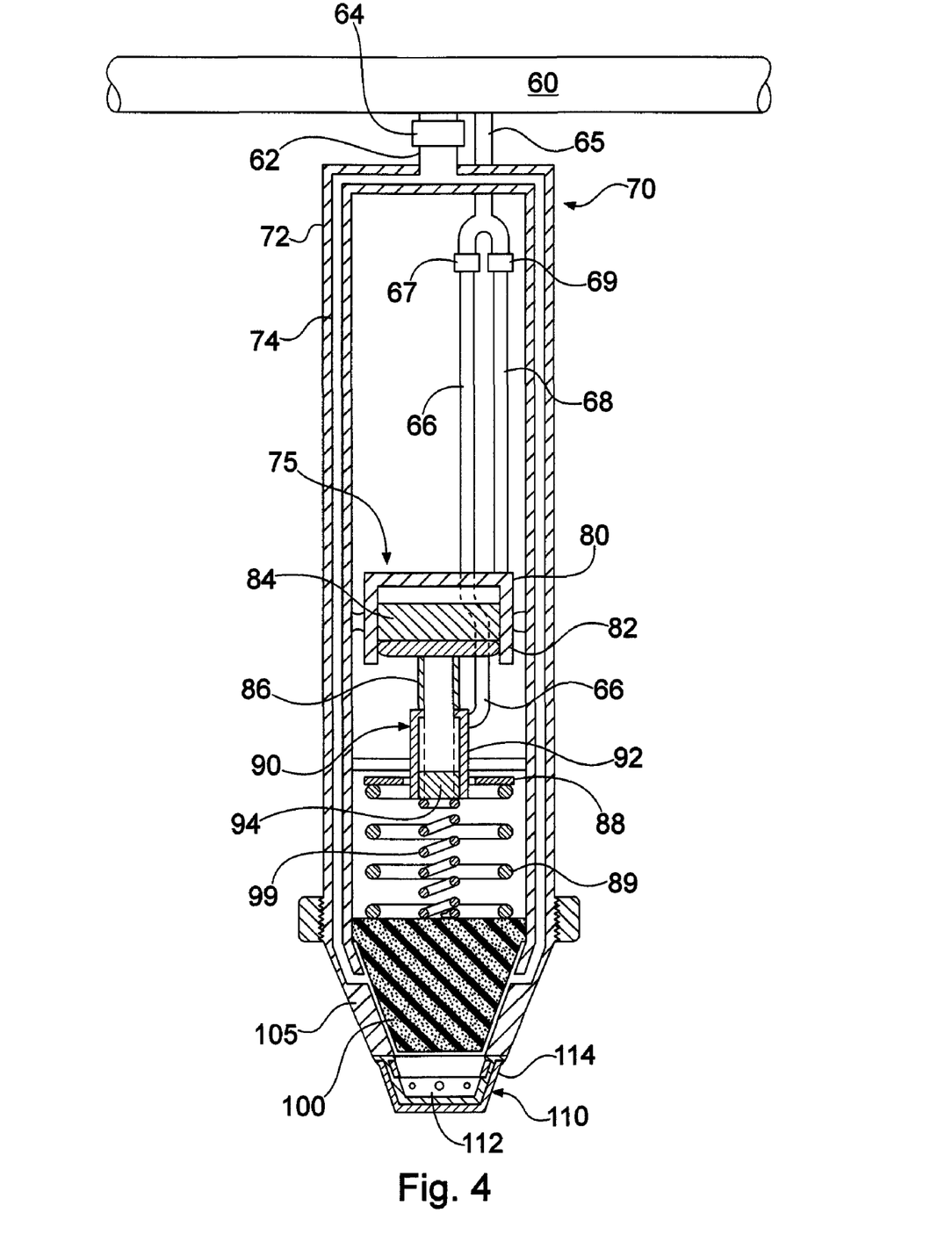
FIG. 4 is an enlarged fragmentary view of a fuel system operable in the engine of FIG. 1.

The details of the fuel system are illustrated in more detail in FIG. 4. In the present instance, a fuel rail 60 is utilized to provide a supply of fuel to all of the injectors 60 at a relatively constant pressure. The fuel rail 60 is connected with a fuel pump, which pumps the fuel from a reservoir. A fuel supply line 62 extends from the rail 60 to the injector to provide a supply of fuel for combustion. Additionally, in the present instance, the fuel system includes an injector control line 65 for providing pressurized fuel to control the operation of the injector as described in more detail below. The control line 65 further divides into two lines, a high-pressure control line 66 and a low-pressure control line 68.

A plurality of control valves are provided for controlling the flow of fuel from the fuel rail 60 to the supply line 62 and the high and low pressure control lines 66, 68. For instance, in the present instance, the system includes a fuel supply control valve 64 for controlling the flow of fuel to the injector for providing combustion. Additionally, in the present instance, the system includes separate valves for controlling the high and low pressure control lines: a high-pressure control valve 67 controls the flow of fuel from the fuel rail to the high-pressure control line 66; and a low-pressure control valve controls the flow of fuel from the fuel rail 60 to the low-pressure control line 68.

Each of the control valves can be any of a variety of mechanically or electronically controlled valves. In the present instance, the control valve 64, 67, 69 are electronically controlled solenoids that are connected with and controlled by a central processor, such as an electronic engine control unit (ECU) 200 as discussed further below.

The injector 70 is operable to supply a spray of fuel from the fuel rail to the combustion chamber at a predefined fuel pressure. In the present instance, the injector may be configured so that it may be varied to alter the fuel pressure of the spray in response to an operating parameter of the engine. In this way, the injector can alter the combustion dynamics in response to the operation of the engine. For instance, at low loads, the injector may inject fuel at a first pressure, and at increased loads, the injector may inject fuel at a second pressure. The injector 70 may be configured to allow continuously variable fuel pressures in response to variation in the operating parameter of the engine. For instance, as the load on the engine increases, the fuel pressure may continuously vary. Although the injector may be configured to be continuously variable, in the present instance, the injector is configured to provide two different fuel pressures in response to the operating parameter. Specifically, the injector operates to provide fuel at a first pressure while the operating parameter remains within a predetermined operating range. Once the operating parameter exceeds the operating range, the injector provides fuel at a second pressure as long as the operating parameter exceeds the operating range. In other words, the injector operates in a step like fashion. Within a first operating range, the injector provides fuel at a first pressure. As soon as the operating parameter exceeds a threshold, the injector steps up to provide fuel at a second pressure. In this way, rather than the pressure being continuously variable, the fuel pressure alternates between a first pressure and a second pressure. It should be noted that during operation, both the first pressure and the second pressure are non-zero pressures.

Referring again to FIG. 4, the injector 70 includes an axially elongated generally cylindrical housing 72. A nozzle 110 for spraying the fuel into the combustion chamber 23 is attached to the lower end of the injector housing. A conduit within the wall of the housing forms a fuel passage 74 from the upper end of the housing 72 to the nozzle 110. The fuel passage 74 is connected to the fuel supply line 62 at the upper end so that a continuous fluid path is provided from the supply line to the nozzle.

A flow regulator 75 controls the flow of fuel through the fuel passage to the nozzle. In a first condition, the flow regulator 75 controls the fuel passage so that fuel is provided to the nozzle at a first pressure, and in a second condition, the flow regulator controls the fluid passage so that fuel is provided to the nozzle at a second pressure. As shown in FIG. 3, the flow regulator 75 comprises a frustoconically shaped needle valve element 100 that seats in a valve seat 105. The valve seat 105 is an internally tapered wall having a wall taper that corresponds to the taper of the exterior surface of the valve element 100. In this way, the valve element cooperates with the valve seat 105 to provide a variable opening in the form of the gap between the valve element and the valve seat. When the needle valve element 100 is in the first position, the valve element is displaced toward the valve seat 105, so that the flow of fluid is throttled by the valve. By throttling the fuel flowing through the fuel passage 74, the speed of the fuel passing into the nozzle is increased, while at the same time the pressure of the fluid discharging into the nozzle is decreased. When the needle valve element is in the second position, the valve element is displaced away from the valve seat so that the orifice between the valve element and the valve seat is larger when the needle valve element is in the second position than the size of the orifice when the needle valve element is in the first position. Accordingly, by displacing the needle valve element between the first and second positions, the fuel pressure to the nozzle can be alternated between first and second fuel pressures.

The injector 70 may incorporate any of a variety of systems for controlling the needle valve. In the present instance, the needle valve is controlled by spring pressure and may be continuously variable if the device allows for resonance throughout the range, as discussed further below. The valve is controlled by a pair of springs having different spring characteristics. The pair of springs are selected so that the springs cooperate with the needle valve so that the fuel is delivered to a plenum at the end of the injector within a generally narrow pressure range regardless of the delivery rate.

Additionally, in the present instance, the springs are selected so that the springs create a resonance in the fluid and spring. The resonance creates slight reciprocation or "hopping" of the valve in sympathy with the vibration of the fluid. In turn, the resonance causes the spray of fuel to break up into droplets more readily than without such resonance, thereby improving the mixing of the fuel and air in the combustion chamber. The improved fuel/air mixing decreases the amount of fuel droplets that reach the wall of the cylinder.

Referring again to FIG. 4, the details of the flow regulator 75 will be described. The flow regulator 75 includes a high-pressure regulator 80 and a low-pressure regulator 90. More specifically, in the present instance, the flow regulator 75 includes a pair of springs 89, 99 that bear against the needle valve 100 to bias the needle valve toward the closed position. As the fuel flows through the fuel passage 74, the fuel is discharged against the needle 100. Because the needle 100 is tapered, the force of the fuel impinging on the needle creates an axial force urging the needle upwardly against the bias of the springs 89, 99.

In the present instance, the flow regulator 75 controls the biasing force applied to the needle to control the opening of the needle valve. Specifically, since the fuel pressure supplied by the rail is fairly constant, the force applied by the fuel impinging on the needle 100 is generally constant. Accordingly, the opening of the needle valve is controlled by the amount of downward force provided by the first and second springs 89, 99. When the needle 100 is controlled by the bias of the first spring 89, the needle valve opens a first amount in response to the fuel flowing against the needle. Alternatively, when the needle 100 is controlled by the bias of the second spring 99, the needle valve opens a second amount in response to the fuel flowing against the needle.

The high-pressure regulator 80 and low-pressure regulator 90 interact with the springs 89, 99 to control the position of the needle 100. The first spring 89 is an outer spring that circumscribes the second spring 99, which is an inner spring disposed within the first spring.

The high-pressure regulator 80 is operable to variably compress the outer spring 89 on demand. The high-pressure regulator 80 includes a cylinder 82 fixedly connected to the interior wall of the injector housing 72. A piston 84 is slidably displaceable within the cylinder 82. The piston 84 is operatively connected with an extension 86 that transmits displacement of the piston to the outer spring. More specifically, the extension 86 is connected, such as by welding to a ring having a diameter that is generally similar to the diameter of the spring. As the piston 84 is displaced downwardly, the extension arms displace the ring downwardly, which in turn compresses the outer spring 89.

In order to displace the piston 84 in the high-pressure regulator 80, the cylinder of the high-pressure regulator is connected with the high-pressure control line 66, so that fuel can be injected into the regulator cylinder to create pressure in the cylinder, thereby displacing the piston 84 downwardly.

Similarly, the low-pressure regulator comprises a cylinder 92 fixedly attached to the interior wall of the injector housing and a piston 94 that is reciprocally displaceable in the cylinder. The piston 94 is directly engageable with the inner spring 99 to selectively compress the inner spring when the piston is displaced downwardly. Specifically, the cylinder of the low-pressure regulator 90 is connected with the low-pressure control line 68, so that fuel can be injected into the regulator cylinder 92 to create pressure in the cylinder, thereby displacing the piston 94. Each piston is provided with a stop in order to create the exact required spring tension to create the desired pressure.

As discussed above, the flow regulator 75 controls the needle valve by the selected diversion of pressurized fuel to the high and low pressure cylinders. To relieve the pressure, the injector 70 may include a drain line for draining the fuel from the high and low pressure cylinders. For instance, the solenoid valves 67, 69 may allow the fuel creating pressure in the high or low-pressure cylinder to be bled to a drain line that is then bled to the fuel tank. Specifically, the valves 67, 69 may be three-way valves interconnected with a drain line that is also connected with the fuel tank. When the valves 67, 69 open the flow to the drain line, the bias in the springs 89, 96 force the fluid from the high and/or low pressure cylinder(s).

The outer and inner springs 89, 99 are selected in terms of the diameter of the wire and the spacing of the coils so that the inner spring has a higher spring constant. In this way, compressing the inner spring by a first amount creates greater biasing force against the needle than the same amount of compression applied to the outer spring. It should be noted, that the high and low pressure regulators 80, 90 are positioned and configured so that the springs 89, 99 are essentially in a relaxed state providing little or no bias against the needle when neither of the cylinders are filled with fuel from the high or low pressure control lines 66, 68. Additionally, both of the pressure regulators 80, 90 include a stop in the cylinder 82, 92 to limit the inward retraction of the piston into the cylinder to ensure that the springs remain in operative contact with the pistons. The springs 89, 99 are also selected so that each spring's effect on the needle 100 provides a resonance that aids in the formation of the spray pattern. The use of two separate springs allows such variables as the spacing between the coils, the thickness of the coils, and the material used to be chosen so as to tune the spring characteristics so as to produce vibration in the spring and resonant vibration in the fluid.

Figure 5:
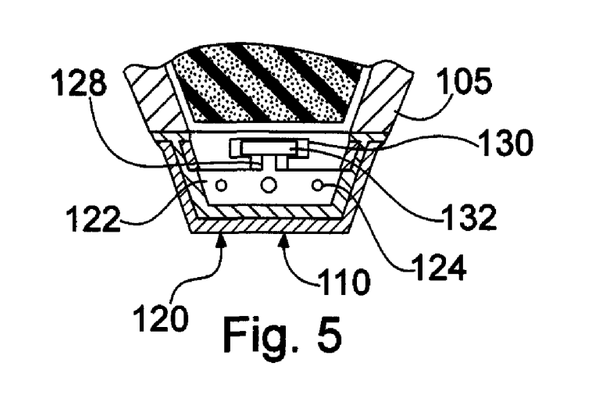
FIG. 5 is an enlarged fragmentary sectional view of an alternate fuel injector of the fuel system illustrated in FIG. 4.
Figure 6:
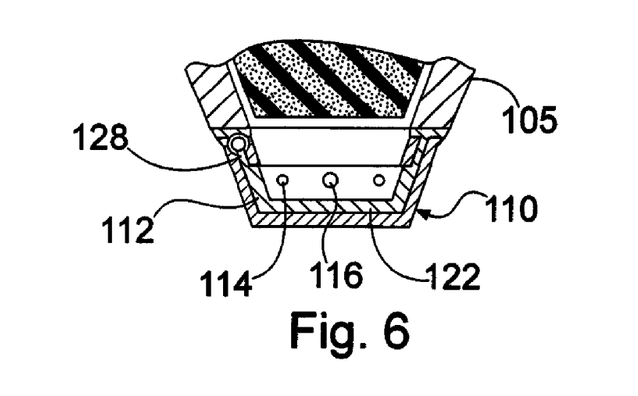
FIG. 6 is an enlarged fragmentary sectional view of the fuel injector illustrated in FIG. 5 taken along a plane normal to the plane of FIG. 5.
Figure 7:
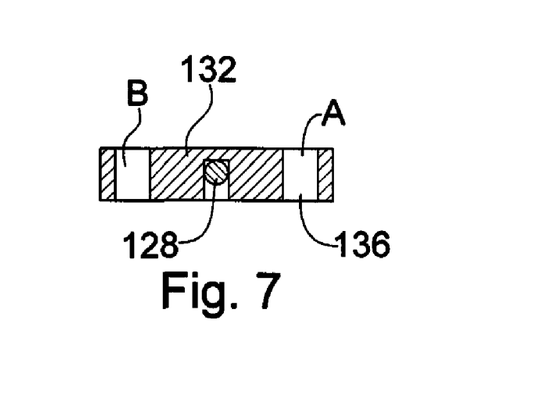
FIG. 7 is an enlarged fragmentary section view of the fuel injector illustrated in FIG. 6 taken along the line 7-7.

As described above, the fuel injector 70 includes a flow regulator 75 that is operable to provide a flow of fuel to the nozzle at either a first fuel pressure or a second fuel pressure. It should be understood that the fuel pressure provided by the rail in either mode may vary in response to engine operating parameters such as rpm (revolutions per minute). However, in the present system, the fuel pressure in the rail is controlled so that the fuel pressure from the fuel rail generally stays within approximately 10% of the predetermined, regulated fuel pressure. Accordingly, although the first and second regulated fuel pressures provided by the nozzle are generally constant, the fuel rail pressure may vary within a narrow range in order to regulate the delivery rate of the fuel through the nozzle. Because the opening of the nozzle will increase slightly with a higher rail pressure, the resulting delivery pressure may vary slightly. However, the variation in the first and second pressures in response to variation in the fuel rail pressure is significantly less than the difference between the first and second pressure. For instance, in the present instance, the fuel rail may provide fuel to the fuel injectors at a fuel pressure of approximately 1300 psi, and the fuel injectors control the fuel to provide a first pressure of approximately 1200 psi. Similarly, the second pressure may be approximately 400 psi, and the fuel rail may provide fuel to the injectors at approximately 500 psi. Accordingly, even with the potential variation in fuel rail pressure, the first and second pressures will still be generally constant relative to the difference between the two pressures.

In addition to controlling the fuel pressure, the flow controller 75 of the fuel injector 70 is operable to control the flow rate of the fuel. Specifically, regardless of the fuel pressure variations or whether the system is operating under a high pressure or low pressure condition, the flow regulator 75 is operable to control the flow rate of the fuel so that the proper amount of fuel is provided at the proper pressure to meet the demand conditions of the engine.

By providing a control for controlling the flow of fuel to the nozzle 110 the spray pattern provided by the injector varies accordingly. For instance, when fuel is provided to the nozzle at the first pressure, the fuel will tend to discharge through the discharge orifices in the nozzle in a spray pattern having droplets of a first size. When the fuel pressure is reduced to the second pressure, the fuel will tend to discharge through the discharge orifices in the nozzle in a spray pattern having droplets of a second size that are larger than the first size. In this way, reducing the fuel pressure may create a spray pattern having larger droplets. These larger droplets have a smaller surface area to fuel volume ratio than smaller droplets, so that relative to the smaller droplets, the larger droplets will delay and slow combustion within the combustion chamber.

To further control the droplet size of the spray, it may be desirable to include an element having alternate discharge ports depending upon the desired spray characteristic. For instance, referring to FIGS. 5-7 an alternate embodiment of the nozzle is illustrated in which the injector includes a rotary valve at the nozzle. The rotary valve may be used to control the selection of the nozzle orifices through which the fuel will be sprayed.

For instance, the nozzle 110 may be configured with a first array of discharge ports 114 having a first diameter and a second array of discharge ports 116 having a second diameter that is larger than the first diameter. As an example, in the present instance, the nozzle has six first diameter ports 114 equally spaced about the circumference of a plenum 112 of the nozzle. Additionally, the nozzle includes six second diameter ports 116 equally spaced about the circumference of the plenum and interspaced within the first diameter ports 114.

In the present instance, a nozzle regulator 120 controls the flow of fuel through the first and second discharge ports 114, 116. The nozzle regulator includes a rotary valve element 122 disposed within the nozzle plenum 112. The rotary valve includes a plurality of discharge orifices that align with the discharge ports 114, 116. In the present instance, the rotary valve 122 includes six discharge orifices 124 equally spaced about the circumference of the rotary valve. The spacing of the orifices 124 is such that in a first position, the valve orifices 124 align with the six first diameter ports in the nozzle, and in a second position, the valve orifices align with the six second diameter ports in the nozzle. In this way, rotating the rotary valve between the first and second position controls which of the arrays of discharge ports to which the fuel will be directed.

A variety of mechanism can be used to selectively rotate the rotary valve element to control which of the nozzle orifices the fuel flows through. For instance, an electronic actuator can be provided to rotate the valve in response to a signal from the ECU 200. Alternatively, a mechanical actuator can be utilized to control the nozzle regulator 120.

For instance, in the present instance, the nozzle regulator 120 utilizes a mechanical actuator utilizing the high and low pressure lines 66, 68 that also are used to control the operation of the flow regulator 75 for regulating the fuel pressure of the fuel flowing to the nozzle. As shown in FIGS. 5-6, the flow regulator 120 includes an actuating pin 128 connected to the rotary valve 122 and extending upwardly from the valve. As shown in FIG. 7, the opposite end of the actuating pin 128 engages a control piston 132. The control piston 132 is slidably displaceable within a control chamber 130 formed within the wall of the injector.

As mentioned above, a variety of mechanisms may be used to control the displacement of the control piston 132, however, in the present instance, fluid pressure is used to control the position of the piston. Specifically, the control chamber 130 is in fluid communication with the high and low-pressure lines 66, 68 that control the high and low-pressure control valves 67, 69. The control chamber is interconnected with the high and low pressure lines in such a way that the high pressure line is in fluid communication with a first end of the chamber (designated A in FIG. 7) whereas the low pressure line is in fluid communication with the second or opposite end of the chamber (designated B in FIG. 7). In this way, when the high pressure fluid line is actuated so that fuel flows from the fuel rail 60 to the high pressure regulator 80, fuel also flows to end A of the control chamber. As fluid flows into end A of the control chamber 130, the control piston 132 is displaced toward end B of the control chamber. At the same time, the control piston 132 displaces the actuating pin 128 and attached rotary valve 122 toward a first position. In this position, the rotary valve is aligned with the first set of discharge ports 114 in the nozzle. Alternatively, when the low-pressure fluid line is actuated so that fuel flows from the fuel rail 60 to the low pressure regulator 90, the flow of fuel to end A of the control chamber 130 is discontinued. Instead, fuel flows from the low-pressure fluid line to end B of the control chamber 130. As the fuel flows into end B of the control chamber, the control piston 132 is displaced toward end A of the control chamber, thereby displacing the actuating pin 128 and attached rotary valve 122 toward a second position. In the second position, the orifices 124 in the rotary valve are aligned with the second set of discharge ports 116 in the nozzle. In this way, when the high-pressure control line 66 is opened, the flow regulator 75 controls the flow of fuel to the nozzle so that the fuel at the nozzle is under high pressure. At the same time, the nozzle regulator 120 regulates the discharge ports so that the high-pressure fuel is discharged through the smaller set of discharge ports. Alternatively, when the low pressure control line is opened, the flow regulator 75 controls the flow of fuel to the nozzle so that the fuel at the nozzle is under low pressure (relative to the high pressure flow), and the nozzle regulator 120 regulates the discharge ports so that the low pressure fuel is discharged through the larger set of discharge ports. In this way, the spray pattern is controlled by both the pressures of the fuel at the discharge nozzles, as well as by controlling the diameter of the discharge ports in the nozzle. At the end of an injection, the fluid may drain from the control chamber 130 as the fuel is drained from the high/low pressure cylinders 80, 90 as described above.

As described above, the nozzle 110 has two sets of discharge orifices 114, 116 that are used to vary the spray of fuel. Additionally, it may be desirable to alter other characteristics regarding the discharge orifices to alter the spray pattern. For instance, in addition to the orifices 114, 116 being different diameters, the orifices may be differently shaped. Further, the angle of the discharge orifices in relation to the vertical centerline of the cylinder may be altered to change the direction of the spray depending upon whether high-pressure fuel is being sprayed or low-pressure fuel. For instance, if the spray is high-pressure spray, the orifices 114 may be angled to direct the spray more outwardly than downwardly toward the sides of the combustion chamber. Alternatively, for the low-pressure spray orifices 116, the orifices may be angled to direct the spray more downwardly than outwardly.

As mentioned previously, the operation of the engine 10 is controlled by an engine control unit 200, referred to as an ECU. The ECU 200 may be interconnected with a central control unit that receives signals from all of the various control units of a vehicle. The ECU is operable to receive signals from various sensors within the system and to send signals to various elements within the engine system to control operation of the engine.

Figure 2:
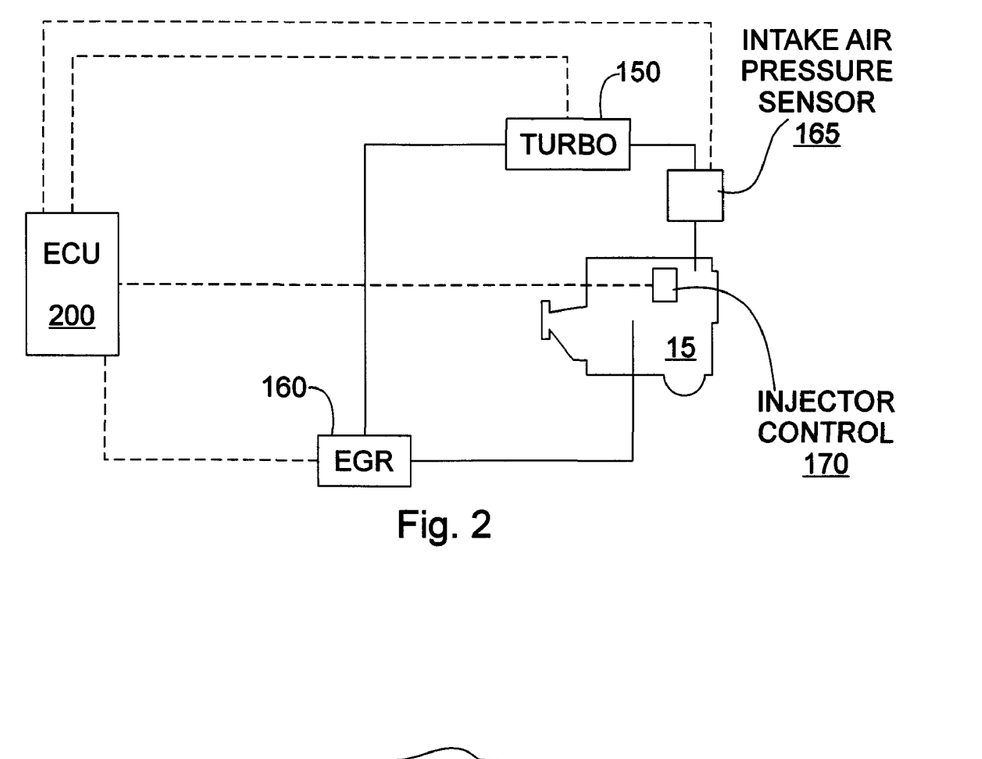
FIG. 2 is a diagrammatical view of the internal combustion engine of FIG. 1.

Referring to FIG. 2, several of the interconnections between the various systems in the engine are illustrated. For instance, as shown in FIG. 2, the engine may include one or more turbo chargers 150. A sensor on the turbocharger may provide a signal to the ECU regarding an operating characteristic of the engine, such as the air pressure or temperature at the turbocharger outlet. In addition to a turbocharger, it may be desirable to include an exhaust gas recirculation system 160, referred to as an EGR. The EGR 160 re-circulates a portion of an engine's exhaust gas back to the engine cylinders. The recirculated exhaust gases are intermixed with the incoming air so that the recirculated exhaust gases dilute the mix with inert gas. The resulting mixture of exhaust gases and incoming air has a lower adiabatic flame temperature than air alone, and reduces the concentration of oxygen. The exhaust gas also increases the specific heat capacity of the mix, thereby lowering the peak combustion temperature and affecting the reaction kinetics so as to reduce the peak reaction rates. The ECU 200 may be interconnected with the turbocharger 150 to receive signals from a control unit for the turbocharger and to send signals to the turbocharger control unit to control the operation of the turbocharger in response to signals the ECU receives from various systems regarding the operation of the engine. Similarly, the ECU 200 may be interconnected with a sensor 165 that monitors the intake air pressure. The intake air sensor 165 may provide signals to the ECU regarding the varying intake air pressure, which may be indicative of the load on the engine. In response to such information, the ECU may control operation of various systems, such as the injector control unit 170.

The ECU 200 is described above as being interconnected with a plurality of smaller control units that control various aspects of the engine. However, it should be understood, that the ECU could alternatively be interconnected directly with various elements in the engine to directly control the operation of the various elements rather than sending signals to the various control units, which control the various elements in response to the signals received from the ECU.

Method of Operation

Configured as described above, the operation of the engine 10 will now be described in greater detail. The ECU 200 controls the operation of the engine 10 in response to signals received from various elements of the system. For instance, the ECU controls the operation of the fuel injection system based on various signals received from different elements, such as a signal from a throttle unit (or from a central controller) indicative of the throttle position, signals from a sensor monitoring the RPMs of the system and signals indicative of the load on the system, such as signals from the intake air pressure sensor 165.

During operation, rotation of the crankshaft 59 causes rotation of the camshafts 45, 47, which control operation of the intake and exhaust valves 35, 37. For instance, during a first stroke, referred to as the intake stroke, the intake cam 45 opens the intake valve to open the valve to allow air to enter the cylinder 20 through the air intake port 30. During the intake stroke, the rotating crankshaft displaces the piston downwardly, away from the cylinder head. At the end of the intake stroke, a biasing element closes the intake valve.

After the intake stroke, the ECU controls the fuel injection system to inject fuel into the cylinder as described further below. At the same time, the crankshaft displaces the piston upwardly toward the cylinder head, thereby compressing the fluid in the cylinder. This stroke is referred to as the compression stroke, and during the compression stroke both the intake and exhaust valves are closed.

By the time the piston 50 reaches top dead center, the compression of the fluid in the cylinder increases the temperature of the fluids sufficiently to cause combustion, which forces the piston downwardly, thereby turning the crankshaft during the downward travel. This downward stroke of the piston is referred to as the power stroke, and the intake and exhaust valves are closed during this stroke. The precise point at which combustion commences on the compression stroke is related to the fluid dynamics within the spray, not merely to the temperature of the fluids. The size and shape of the sprays, the timing of the injection, and the size of the droplets are all variables that interact to produce a certain mixture ratio at each point in the compression stroke. All these variables, along with the differing reaction kinetics created by the resulting mixture ratios, cooperate in preventing pre-ignition. The size of the droplets, and the spray configuration delay ignition to an appropriate timing, in spite of the very early injection, by exploiting the rising temperature and the reduction in the rate of pressure rise that occur as the piston approaches Top Dead Center. This stabilizes the ignition timing in spite of changes in load and rpm.

After the end of the power stroke, the exhaust camshaft opens the exhaust valve to allow combustion gases to be discharged out the exhaust port 32. While the exhaust valve is open, the crankshaft drives the piston back upwardly thereby forcing the combustion gases out of the cylinder through the exhaust port. This fourth and final stroke of the cycle is referred to as the exhaust stroke.

As mentioned above, in the present instance, the ECU 200 sends signals to the fuel injection control unit to control the injection of fuel into the cylinders 20. The injection of fuel may be controlled so that fuel is injected at the beginning or end of the compression stroke, or even during part of the power stroke. However, in the present instance, the injection of fuel is timed to occur so that the injection commences and ends during the compression stroke.

More specifically, the ECU 200 sends a signal to the fuel injection system indicating that fuel is to be injected into the cylinders. The ECU also indicates which of the cylinders fuel is to be injected into. The timing of the fuel injection and which cylinders are to receive fuel is based on information regarding certain operational parameters of the system, such as the position of the crankshaft, which correlates to the position of a piston 50 within the cylinder.

In response to the signal received from the ECU, the injection system begins injecting fuel into the cylinder during the compression stroke well before the piston reaches top dead center (i.e. BTDC). For instance, under normal load, the injection will occur commencing at least 20 degrees BTDC, and in the present instance, injection will occur at approximately 29 degrees BTDC. Additionally, under increased load conditions, the injection may be controlled so that the injection occurs earlier in the compression stroke. For example, in the present instance, when the engine is under a load above a predefined threshold, the fuel is injected approximately 50 degrees BTDC or later, such as 40-45 degrees BTDC.

In addition to controlling the commencement of the fuel injection, the fuel injection control system is operable to control the duration of the fuel spray. For instance, the injection may be varied to last up to approximately 30 degrees of crankshaft rotation. However, in the present instance, the injection lasts for approximately 10 degrees or less of crankshaft rotation. The duration of fuel injection may be varied depending upon whether the system is operating under a normal condition or under an increased load condition. However, in the present instance, regardless of the time that the fuel injection commences, the duration of the fuel injection is substantially the same (i.e. approximately 10 degrees or less).

As described above, although the engine can be operated according to a variety of injection profiles, in the present instance the fuel injection commences and ends during the compression stroke (i.e. before 0 degrees BTDC). Additionally, in the present instance, the fuel injection is relatively short, lasting approximately 10 degrees or less. Further still, the fuel injection commences after an intake stroke and during the compression stroke, but substantially earlier than the time that current diesel engines commence injecting fuel (e.g. approximately 5-10 degrees BTDC). Instead, in the present instance, the fuel injection commences between approximately 50 degrees BTDC and 30 degrees BTDC depending on the operational characteristics.

As described above, the ECU controls the injection of fuel based on signals the ECU receives regarding the load on the engine 10. Additionally, or alternatively, the injection of the fuel may be based on other operational characteristics of the engine. For instance, the fuel injection may be based upon the information regarding the load on the engine in combination with information regarding the engine's RPMs. Additionally, information regarding the intake air temperature and/or pressure can be used to determine the injection parameters.

The ECU can dynamically monitor and control the fuel injection parameters on a continuously variable basis. For instance, the ECU can control the timing of the injection to vary the injection start time at any point along a continuum commencing at about 50 degrees BTDC and ending at about 25 degrees BTDC. However, in the present instance, the injection is controlled to alternate between two states. One state correlates to a first operational characteristic, such as normal load, and a second state correlates to a second operation characteristic, such as increased load. When the ECU detects that the first operational characteristic is within a first range, the fuel injection commences at the first predetermined commencing time, such as approximately 29 degrees BTDC. Alternatively, when the ECU detects that the second operation characteristic is within a second range, the fuel injection commences at the second predetermined commencing time, such as approximately 45 degrees BTDC.

Figure 8:
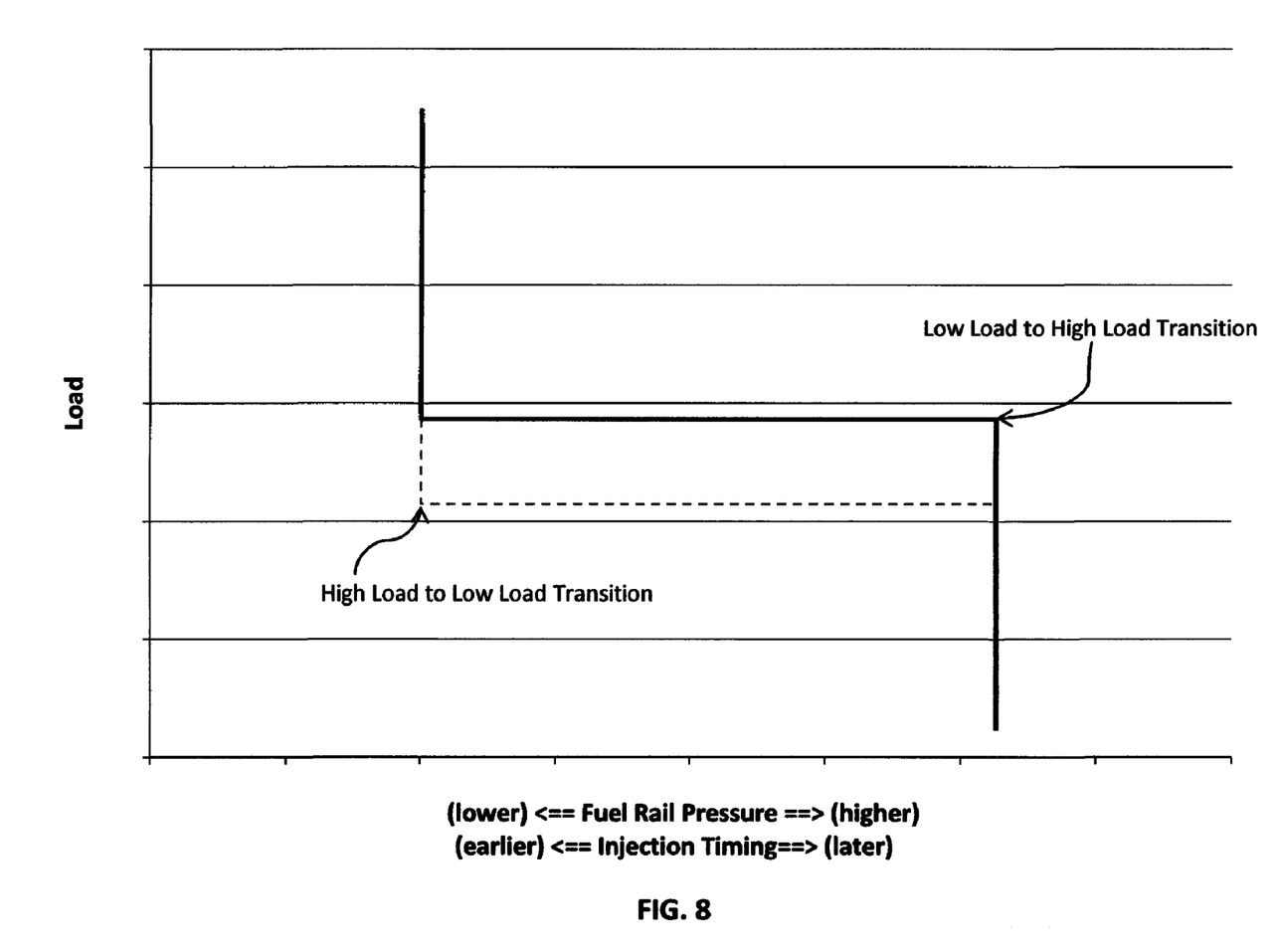
FIG. 8 is a graphical diagram of the relationship between operational parameters for the engine of FIG. 1.

The relationship between the timing of the injection and the load on the engine is illustrated graphically in FIG. 8. As can be seen, the ECU may control the engine so that the fuel is injected earlier when the engine is operating under higher load (reflected by increased Intake Pressure), whereas the injection may occur later when the engine is operating under lower load. FIG. 8 also shows an inverse relationship between the fuel rail pressure and the load on the engine, as discussed further below.

In addition to controlling the timing of the fuel injection, the ECU may control the injection system to control the spray characteristics. For instance, when the engine is operating within a first operating range, the injection system operates the high-pressure control valve 67 to provide a flow of fuel to the high-pressure regulator 80. While the high-pressure control valve is open, the low-pressure control valve is closed. The flow of fuel fills the cylinder 82, thereby displacing the piston 84, which in turn displaces the extension arms 86. Displacing the extension arms 86 also displaces the connected ring 88, which compresses the outer spring 89. In this way, the bias force of the outer spring 89 against the needle 100 is increased, thereby effectively throttling the opening between the needle and the valve seat 105.

Alternatively, when the engine is operating within a second operating range, the injection system opens the low-pressure control valve 69 to provide a flow of fuel to the low-pressure regulator 90. While the low-pressure control valve is open, the high-pressure valve is closed. The flow of fuel from the low-pressure control line 68 fills the cylinder 92, thereby displacing the piston 94 downwardly. The downward displacement of the piston compresses the inner spring 99, so that the inner spring provides the substantial portion of the bias force against the needle. The increased biasing force caused by the compressed inner spring effectively throttles the opening between the needle and the valve seat. However, the amount of throttling provided by the inner spring is different from the amount of throttling provided by compression of the outer spring of the high-pressure regulator 80.

By automatically controlling the flow regulator 75, the system controls the fluid pressure of the fuel entering the nozzle so that the fuel is at either a first fuel pressure or a second fuel pressure. In this way, the system automatically controls the fuel pressure of the fuel being sprayed into the cylinder.

Yet another spray characteristic that is automatically controlled is the droplet size. As discussed previously, the nozzle regulator may be automatically controlled by the ECU similar to the flow regulator 75 of the injector 70. Specifically, when the high-pressure control valve 67 is opened, fuel may flow into a control chamber 130 to displace the control piston 132 toward a first position. By doing so, the piston drives an actuating pin, which drives a rotary valve to a first position. In the first position, the rotary valve is aligned with a first set of discharge orifices. In this way, when the ECU controls the fuel control supply valve 64, fuel flows from the fuel rail 60 through the fuel supply line 62, then through the discharge ports in the nozzle to provide a spray of fluid. Although the fuel is sprayed at a high pressure relative to the low-pressure level of the present system, the high pressure is still significantly lower than the fuel pressure of the typical compression ignition systems employed currently. For instance, the high pressure is less than approximately 2-3,000 psi, and in the present instance is less than approximately 1,500 psi. In contrast, a typical compression ignition system currently employed normally uses a fuel spray in excess of 30,000 psi. Accordingly, in the first position, the spray is a low fluid pressure spray of fuel having relatively large droplets.

When the ECU detects that the system is operating within a second operation range, the ECU controls the fuel injection system so that the nozzle regulator is rotated into the second position. Therefore, when the ECU sends a signal to open the fuel supply control valve 64, the fuel flows through the fuel supply line to the nozzle at a second pressure, and is discharged through the second set of larger discharge ports 116 in the nozzle. In this way, in the second position, the spray has even lower pressure and even larger droplets than the spray created by the system when the injector is in the first position.

As described above, the engine 10 will operate in a first mode during normal operating conditions, such as idle, cruise and low to moderate acceleration. In this normal mode, the high-pressure regulator 80 of the injector controls the flow of fluid to the nozzle, and the rotary valve 122 in the nozzle is displaced to use the smaller discharge ports. The ECU 200 is programmed so that when the operation characteristic increases, the injectors are switched to the second mode, referred to as the low-pressure mode. For instance, if the system detects that the turbocharger boost pressure reaches a pre-determined level, the ECU controls the fuel injectors to switch the injectors into the low-pressure mode.

In the present instance, the system re-sets the injectors after an injection cycle. Specifically, after the injectors for all of the cylinders in the engine are fired, the fuel supply control valve 64, the high-pressure control valve 67 and the low-pressure control valve 69 are all turned off (i.e. closed). While the valves are closed, all of the injectors switch from the high-pressure to the low-pressure positions. Additionally, the rail pressure is adjusted by dumping fuel to the lower pressure range. Once the rail pressure is adjusted, and the injectors switch from the high pressure to the low pressure positions, injection resumes. This re-set may take 2-4 engine rotations.

In order to provide a smooth transition during the re-setting, which will help avoid torsional vibration in the powertrain, the ECU smoothly reduces the throttle to a very low torque level prior to shutting off the throttle. Once the transition has occurred, the ECU smoothly increases the throttle to the power level input by the driver.

As discussed above, the ECU may control operation of the engine in response to a variety of operational characteristics. For instance, typically the load on the system is monitored, such as by sensing the air intake pressure, and the system alternates the fuel injection system between the high-pressure setting and the low-pressure setting accordingly. However, in certain instances, the ECU may retain the system in either the low-pressure setting or the high-pressure setting regardless of the load.

One example of this alternative control characteristic is when the engine is in one of the lower gears. In order to minimize the effect on the engine's responsiveness, which are each only used for a brief period during acceleration, the engine will be kept in the lower torque, high-pressure mode.

As the load on the engine is reduced, a change from the low-pressure setting back to the high-pressure setting occurs. The threshold for the change is set lower than the threshold for changing from the high-pressure setting to the low-pressure setting. By changing the threshold in this way, the differential keeps the system from rapidly alternating back and forth between the high-pressure setting and the low-pressure setting when the operational characteristic is at or near the threshold. In this way, the different threshold smoothes out the operation of the engine.

In light of the foregoing, some of the features of the improved internal combustion engine and method of operation become apparent. For instance, the improved engine described above provides a combustion system that enhances the reduction of in-cylinder particulate and Nox formation emissions. As such, the system reduces or eliminates the need for after-treatment devices such as Diesel Particulate Filters, and Selective Catalytic Reduction systems needed to reduce these emissions.

Additionally, by employing large droplets of various sizes, the system enhances the BMEP (brake mean effective pressure) detonation limits of a pre-mixed or SCCI (stratified charge compression ignition) system, and, in combination with the configuration of the sprays, reduces or prevents pre-ignition while also stabilizing the timing of the ignition with changes in load and speed.

Furthermore, the combustion system described above is operable to reduce thermal, pressure, and pressure rise-related stresses on the engine. Such reductions are accomplished by providing combustion with a lower pressure rise rate, and a less radiative or non-luminous flame, as well as by reducing the need for Exhaust Gas Recirculation to meet emissions requirements.

Still further, another advantage of the system described above is that it reduces the thermal and chemical stresses on the engine oil, especially the accumulation of soot. As a result, the oil's useful life is extended as well as its effectiveness as a lubricant, which in turn extends the life of engine components that can be otherwise abraded by soot particles as the lubricant degrades.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. A method for controlling a four-stroke compression ignition engine, comprising the steps of:

opening a first valve to allow the intake of air into a cylinder;

injecting fuel into a combustion chamber in the cylinder a first time, wherein the fuel is injected at a first pressure to create a fuel/air mixture in the combustion chamber;

combusting the fuel in the combustion chamber;

opening a second valve to allow exhaust of combustion gases after the step of combusting;

monitoring a characteristic indicative of the load on the engine;

injecting fuel into the combustion chamber a second time at a second pressure in response to the monitored characteristic indicating a load above a first pre-determined threshold;

wherein the second pressure is lower than the first pressure.

2. The method of claim 1 comprising the step of injecting fuel into the combustion chamber a third time in response to the monitored characteristic indicating a load below the first pre-determined threshold, wherein the step of injecting fuel a third time comprises injecting fuel at the first pressure.

3. The method of claim 1 comprising the step of injecting further fuel into the combustion chamber repeatedly during subsequent combustion cycles, wherein the step of injecting further fuel into the combustion chamber comprises injecting fuel at the second pressure until the monitored characteristic indicates a load below a second pre-determined threshold that is lower than the first pre-determined threshold.

4. The method of claim 1 wherein the step of injecting further fuel comprises completing the injection of fuel into the cylinder before combustion commences in the cylinder.

5. The method of claim 1 wherein the step of combusting the fuel comprises compressing the fuel/air mixture to combust the fuel/air mixture without a spark element.

6. The method of claim 1 wherein the steps of injecting fuel a first and second time comprises injecting fuel in a spray having droplets, wherein the step of injecting fuel a first time comprises forming the spray so that the droplets have a first size and the step of injecting fuel a second time comprises forming a spray so that the droplets are larger than the first size.

7. The method of claim 1 comprising the step of controlling the fuel so that the fuel provided to injectors for injecting the fuel is maintained at approximately 2000 psi or less during the step of injecting fuel a first time.

8. The method of claim 7 comprising the step of controlling the fuel so that the fuel provided to the injectors is maintained at approximately 1000 psi or less during the step of injecting fuel a second time.

9. The method of claim 8 wherein the fuel is maintained at approximately 2000 psi or less during the step of injecting fuel a first time and the fuel is maintained at approximately 750 psi or less during the step of injecting fuel a second time.

10. A four stroke compression ignition engine, comprising:

a plurality of cylinders, each having a corresponding piston displaceable within the cylinder to combust a fuel/air mixture without a spark element;

a plurality of fuel injectors for injecting fuel in the cylinders;

a controller for controlling the flow of fuel to the fuel injectors, wherein the controller receives data relating to a characteristic indicative of the load on the engine, and wherein the controller controls the flow of fuel to the fuel injectors so that the fuel pressure decreases in response to detection of an increase of the load on the engine above a predetermined load.

11. The engine of claim 10 wherein the controller is operable to control the fuel pressure of the fuel so that the fuel is provided at a first pressure when the engine operates within a first load range that is equal to or below the predetermined load, and wherein the controller is operable to control the fuel pressure so that the fuel is provided at a second pressure that is lower than the first pressure when the engine operates within a second load range that is above the predetermined load.

12. The engine of claim 10 wherein the controller is operable to control the flow of fluid so that the flow rate of the fuel is sufficient to operate the engine at the desired load even after the decrease in the fuel pressure.

13. The engine of claim 11 wherein at least one of the fuel injectors is configured to provide a spray of droplets having a first size when the engine operates within the first load range, and the fuel injector is configured to provide a spray of droplets having a second size when the engine operates within the second load range, wherein the second droplet size is larger than the first droplet size.

14. The engine of claim 13 wherein the fuel injector has a first set of orifices for providing the spray of droplets of the first size, and a second set of orifices for providing the spray of droplets of the second size.

15. The engine of claim 14 wherein the fuel injector comprises a spray controller for controlling whether fuel is discharged from the first set of orifices or the second set of orifices.

16. The engine of claim 10 wherein the fuel injector comprises a high pressure regulator and a separate low pressure regulator for maintaining the fuel within a predetermined upper and lower limit regardless of the flow rate of the fuel through the injector.

17. The engine of claim 16 wherein the high-pressure and low-pressure regulators are actuable in response to pressurized fuel.

18. The engine of claim 16 comprising control valves for controlling the flow of pressurized fuel to the high and low-pressure regulators.

19. The engine of claim 16 wherein the high and low pressure regulators comprise a pair of biasing elements operable to bias a valve controlling the flow of fluid to discharge orifices of the fuel injector.

20. The engine of claim 19 wherein the biasing elements are tuned to one another to create resonant vibrations in the fuel flowing through the fuel injector.

21. The engine of claim 10 wherein the controller is operable to control the flow of fuel so that the fuel injectors complete the injection of fuel into the cylinder prior to commencement of combustion within the cylinder.

22. The engine of claim 11 wherein the controller is operable to control the flow of fuel so that the fuel injectors commence the injection of fuel into the cylinders earlier when the engine is operating within the first load range than when the engine is operating within the second load range.

23. The engine of claim 11 wherein the fuel injectors inject fuel into a combustion chamber formed by the cylinder and the piston, wherein at least one of the injectors is configured to inject the fuel at a first angle when the engine operates within the first load range and at a second angle when the engine operates within the second load range.

* * * * *